United States Patent [19]

Kashiwazaki

[11] Patent Number: 5,243,529
[45] Date of Patent: Sep. 7, 1993

[54] NAVIGATION APPARATUS

[75] Inventor: Takashi Kashiwazaki, Saitama, Japan

[73] Assignee: Pioneer Electronic Corporation, Tokyo, Japan

[21] Appl. No.: 905,435

[22] Filed: Jun. 29, 1992

[30] Foreign Application Priority Data

Aug. 29, 1991 [JP] Japan .................... 3-218935

[51] Int. Cl.$^5$ ............................ G06F 15/50
[52] U.S. Cl. .................... 364/449; 364/444; 340/990; 340/994; 340/995
[58] Field of Search .......... 364/443, 444, 449, 446; 73/178 R; 340/988, 990, 992, 993, 994, 995

[56] References Cited

U.S. PATENT DOCUMENTS

| | | | |
|---|---|---|---|
| 4,799,162 | 1/1989 | Shinkawa et al. | 340/994 |
| 4,814,989 | 3/1989 | Döbereiner et al. | 340/988 |
| 4,992,947 | 2/1991 | Nimura et al. | 340/990 |
| 5,122,959 | 6/1992 | Nathanson et al. | 340/993 |

FOREIGN PATENT DOCUMENTS 0346493 12/1989 European Pat. Off. .
0440105 8/1991 European Pat. Off. .

OTHER PUBLICATIONS

Patent Abstracts of Japan, vol. 14, No. 325 (P-1075) Jul. 12, 1990 (JPA 2107917).
Patent Abstracts of Japan, vol. 16, No. 75 (P-1316) Feb. 24, 1992 (JPA 3264815).

Primary Examiner—Gary Chin
Attorney, Agent, or Firm—Sughrue, Mion, Zinn, Macpeak & Seas

[57] ABSTRACT

A one-day schedule data representing a plurality of destination information each including a location of a destination and its scheduled arrival time is stored in advance in a nonvolatile RAM of a controller. As a vehicle moves, the controller selects, at predetermined time intervals, the destination information of the destination having the scheduled arrival time closest to the present time among the destinations that have not been reached yet.

4 Claims, 5 Drawing Sheets

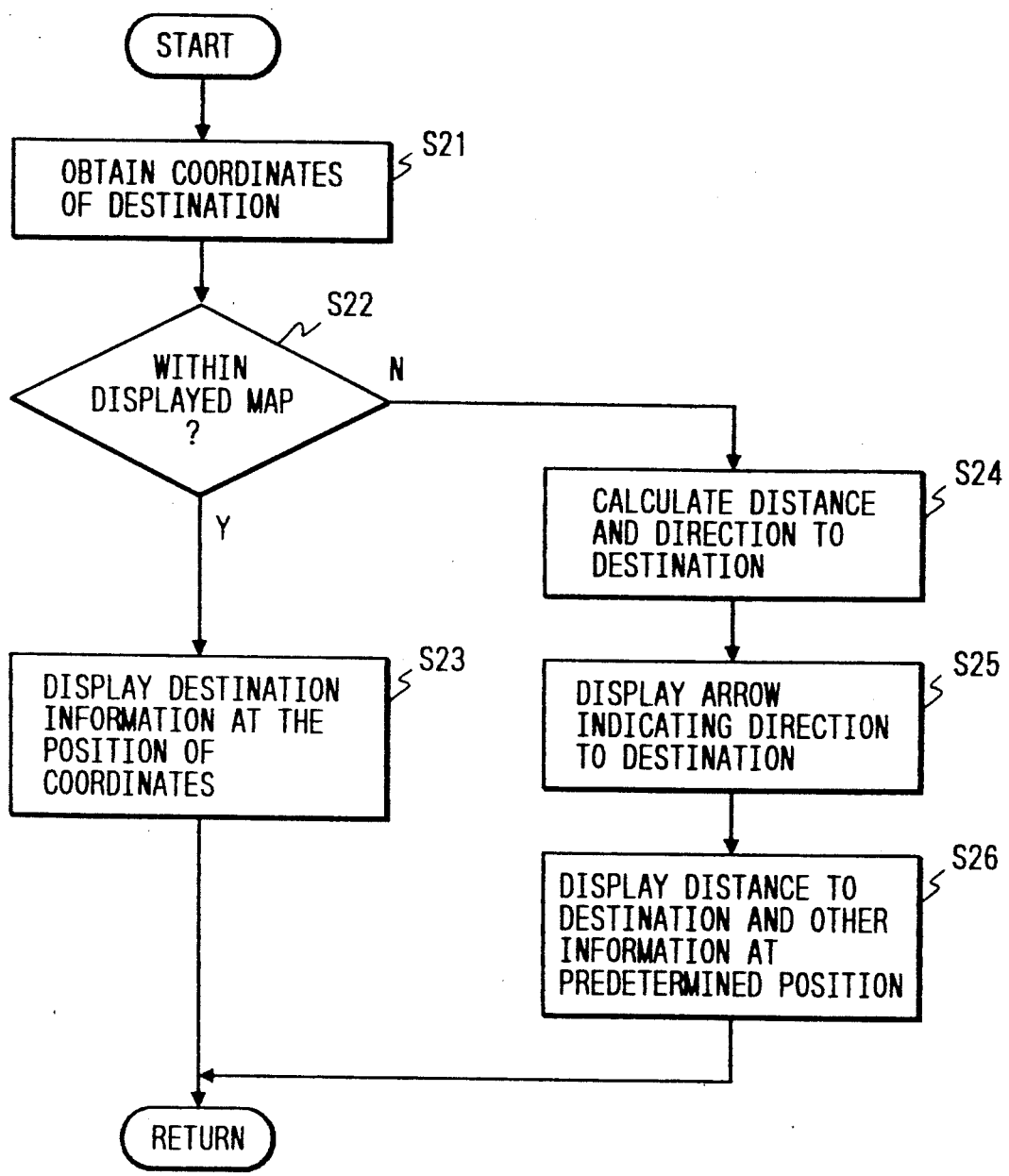

NAVIGATION APPARATUS

BACKGROUND OF THE INVENTION

The present invention relates to a navigation apparatus which, to support a drive of a moving body such as an automobile, displays a map and superimposes a present position of the moving body on the map.

There is known navigation apparatuses which support a drive of an automobile etc. by determining its ever-changing present position using a positioning means based on the GPS (global positioning system) etc. and indicating the present position thus determined at the corresponding position in a map being displayed.

On the other hand, where a moving body such as an automobile is frequently used, its movement schedule may be prepared which includes destinations and scheduled arrival times at the respective destinations. In particular in delivery companies or the like, when one person is required to go to many destinations in a day, a movement schedule is prepared considering an order of visiting destinations, necessary arrival times, etc. and he moves according to the prepared schedule, to make an efficient delivery work.

A movement according to an established schedule is performed as follows. Since a driver is required during his movement to recognize the next destination and a route to reach there, he first confirms the next destination and its address from a schedule table, and then confirms the route by finding the present position and destination on an atlas. In particular, if the driver is not familiar with the locality around the destination (e.g., a tourist resort), he needs to frequently refer to the atlas to recognize the present position and the route to be taken, which is a heavy burden to him.

SUMMARY OF THE INVENTION

An object of the present invention is to provide a navigation apparatus which stores movement schedule data necessary to reach scheduled destinations and displays the next destination together with the own present position, to reduce a driver's burden and to effectively support his drive.

FIG. 1 shows the principle of the invention. The invention is applied to a navigation apparatus which determines a present position of a moving body, and displays the determined present position on a map. The navigation device according to the invention is characterized by a schedule information storing means 1 for storing schedule data representing a plurality of destination information each including at least positional information of scheduled destination and information of scheduled arrival time at the destination; a clock means 2 for producing present time information, and a schedule managing means 3 for selecting, among the destinations stored in the schedule information storing means 1 and having not been reached yet, one destination having the scheduled arrival time closest to the present time provided from the clock means 2, and for displaying the information of the selected destination on the map.

With the above construction, in such a state that the present position has been determined and the map is being displayed, the schedule managing means 3 picks up one destination from the schedule information storing means 1 and displays the information of the selected destination on the map. The schedule managing means selects, at predetermined intervals, the destination having the scheduled arrival time closest to the present time, and displays the information of the selected destination. The destination information may be displayed in the form of a combination of a mark indicating the location of the destination, the scheduled arrival time and a destination name, as shown in FIG. 1 as "displayed map information A". If the destination is outside the map being displayed, the destination information may be displayed in the form of a combination of an arrow mark indicating a direction toward the destination, a distance to it and a destination name, as shown in FIG. 1 as "displayed map information B".

BRIEF DESCRIPTION OF THE DRAWINGS

FIG. 5 is a flowchart showing a process of displaying destination according to the embodiment.

DESCRIPTION OF THE PREFERRED EMBODIMENT

An embodiment of the present invention is described hereinafter in detail with reference to the accompanying drawings.

Figure 2:
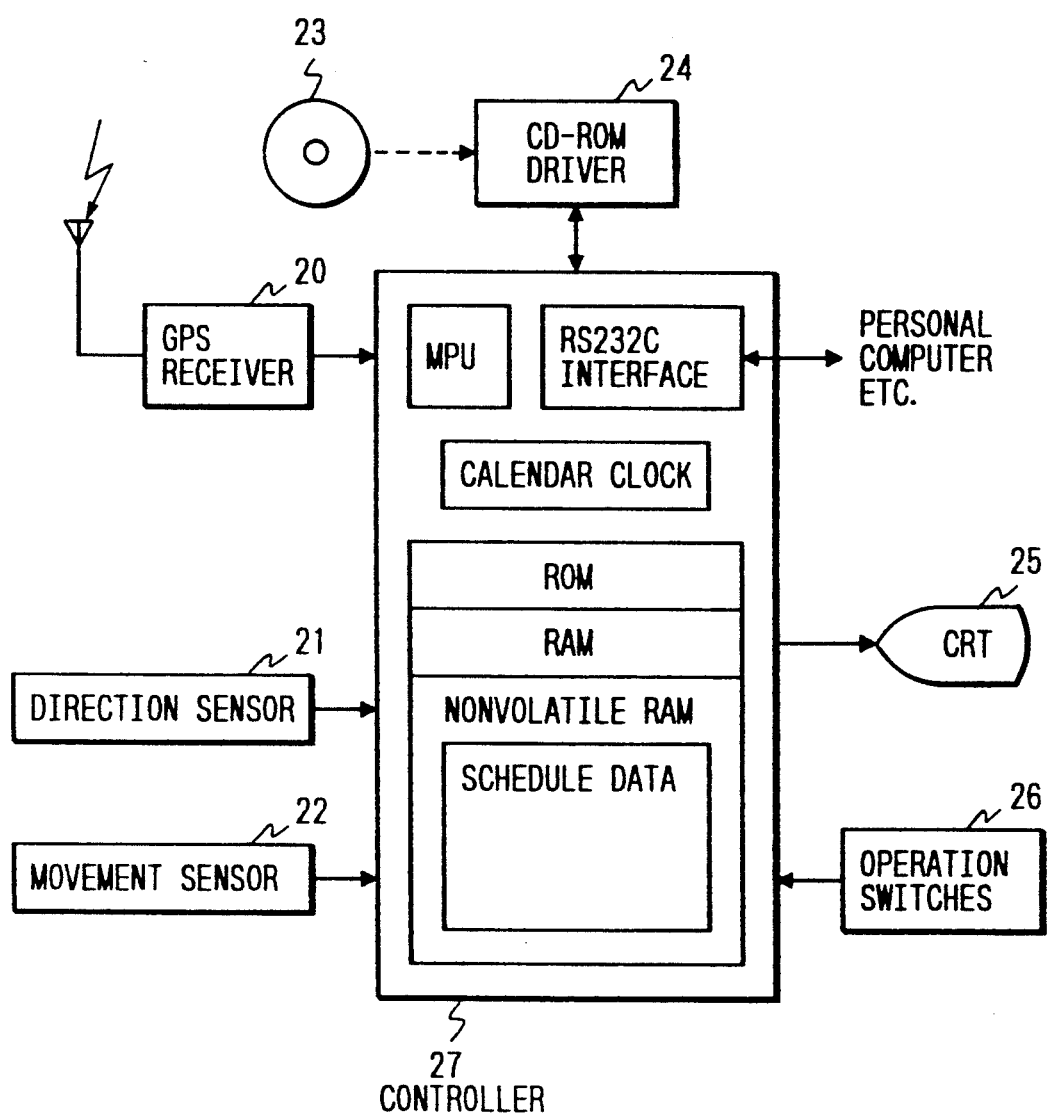
FIG. 2 is a block diagram showing a configuration of a vehicular navigation apparatus according to an embodiment of the invention.

FIG. 2 shows a configuration of a vehicular navigation apparatus according to an embodiment of the invention, which consists of the following components. A GPS receiver 20 receives radio waves for positioning and determines a present position of the own vehicle. A direction sensor 21 detects a moving direction of the vehicle based on geomagnetism or using a gyro etc. A movement sensor 22 detects a movement state such as a moving speed and a movement distance. A CD-ROM 23 is a database of map information, and a CD-ROM driver 24 reads information from the CD-ROM 23. A CRT 25 displays a map and other information. Various instructions can be input through an operation switches 26. A controller 27 controls the entire apparatus.

The GPS receiver 20 is a positioning means which produces present position data indicating a longitude and latitude based on the radio waves from the satellites. The direction sensor 21 and the movement sensor 22 constitutes an independent positioning means, and a computing means in the controller 27 calculates present position data indicating the longitude and latitude based on detection signals provided from these sensors. These two types of positioning means are selectively used in accordance with a drive situation of the vehicle, or used simultaneously to improve the accuracy of detecting the present position.

The controller 27 includes the following. A MPU (microprocessor unit) performs data processing and various kinds of control. A ROM and a RAM store programs for the MPU and other various data. A battery-backed-up nonvolatile RAM is also provided. A calendar clock as the clock means 2 generates data of year, month, day and present time. An RS232C interface is used for data communication with external systems. Other various interfaces (not shown) are also provided. A memory area for storing schedule data is prepared in the nonvolatile memory as the schedule information storing means 1.

With the above construction, the controller 27 performs the following processing to display the present position. Upon switching-on of the apparatus, the controller 27 obtains or calculates present position data from the data sent from the GPS receiver 20 and/or the direction sensor 21 and movement sensor 22, reads the map data including the present position from the CD-ROM 23 via the CD-ROM driver 24, and displays the readout map and a mark indicating the present position on the CRT 25. The controller 27 obtains the present position data at predetermined intervals during movement of the vehicle to renew the display of the map and the present position mark. Further, the controller 27 displays a menu in response to an instruction through the operation switches 26. Upon selection of some item from the menu, the controller 27 reads various kinds of information other than maps from the CD-ROM 23 or ROM, and displays that information on the CRT 25. In the present embodiment, the menu includes an item of displaying the destination. When the "display of the destination" is selected from the menu, the controller 27 as the schedule managing means 3 starts managing schedule data stored in the nonvolatile RAM in accordance with the present time, and displays the destination on the map. In the following, the processing related to the display of the destination is described in detail.

Figure 3:
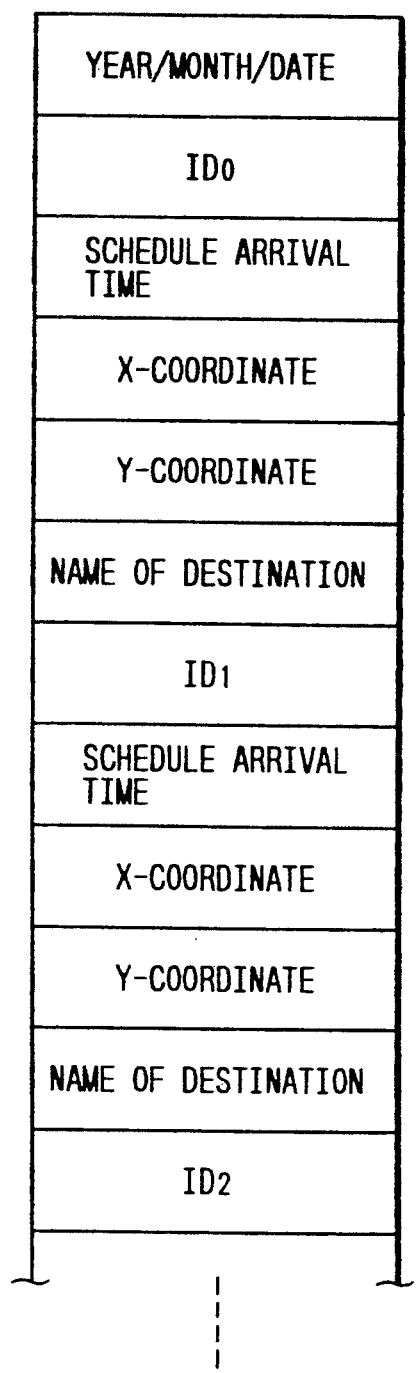
FIG. 3 shows a structure of schedule data according to the embodiment.

FIG. 3 shows a structure of schedule data which is stored in the nonvolatile RAM. As shown, the information for one destination consists of an ID number which indicates a recording number, information of scheduled arrival time at the destination, coordinate information (X, Y) which indicates the location of the destination, and a name of the destination. Information ($ID_0$, $ID_1$, $ID_2$, ...) of a plurality of scheduled destinations of a certain day is stored with year/month/day information as a header. The schedule data is input through the RS232C interface. More specifically, when receiving an instruction of inputting schedule data from a personal computer connected to the RS232C interface, the controller 27 stores, in a sequential manner, the subsequently provided schedule data into the predetermined area of the nonvolatile RAM.

Figure 4:
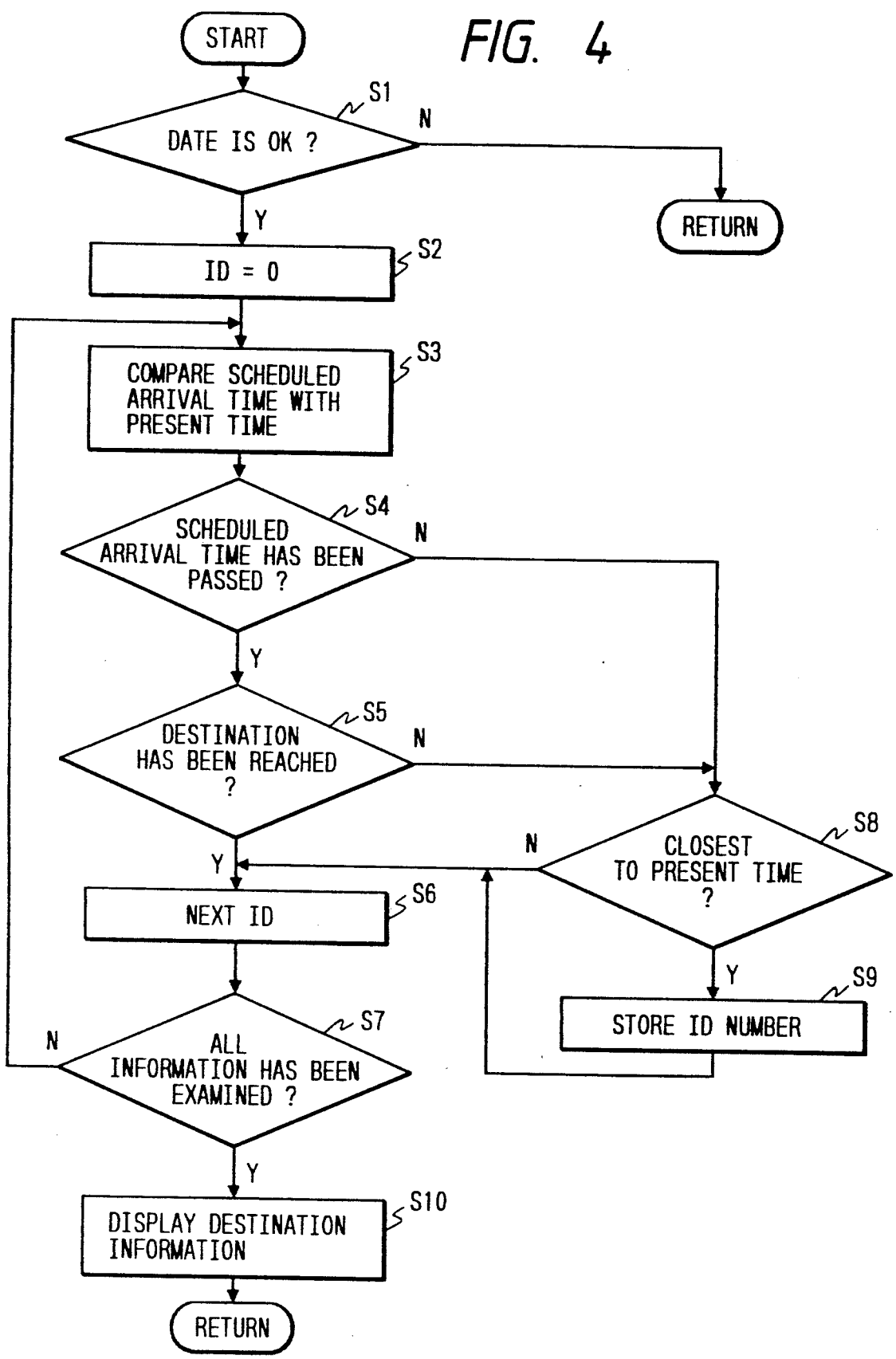
FIG. 4 is a flowchart showing a schedule management process according to the embodiment.

FIG. 4 is a flowchart of schedule management, which is executed by the controller 27 as the schedule managing means 3. In response to the selection of the destination display when a menu picture is displayed, the schedule management processing is activated at predetermined intervals while a map is displayed. In step S1, the controller 27 first judges whether the stored schedule data is one for today based on its year/month/date information. If the judgment is negative, the process of the destination display is not executed. On the other hand, if the judgment is affirmative, in step S2 initialization (i.e., the ID number is made zero) is performed to access the destination information that is located at the first position of the stored data. In step S3, the controller 27 obtains the scheduled arrival time of the accessed destination information and the present time, and compares those times. In step S4, the controller 27 judges whether the present time has passed the scheduled arrival time. If the judgment is affirmative, the controller 27 then judges in step S5 whether the vehicle has already reached the destination. If the judgment is affirmative, that is, if the scheduled arrival time has been passed and the vehicle has already reached the destination, in step S6 the ID number is increased to access the next destination information, and, if it is judged in step S7 that all the information has not been accessed yet, the process returns to step S3 to perform the above operation for the next destination information. On the other hand, if the scheduled arrival time has not been passed yet or if it has been passed but the destination has not been reached yet, it is judged in step S8 whether the scheduled arrival time under examination is the one closest to the present time among the scheduled arrival times already examined. If it is not the one closest to the present time, the process returns to step S6 to examine the next destination information. If it is the one closest to the present time, the ID number of this destination information is stored in step S9, and the process goes to step S6. When all the destination information has been examined, the destination information of the stored ID number, that is, the destination information having the scheduled arrival time closest to the present time is displayed in step S10, and the process is finished.

Figure 1:
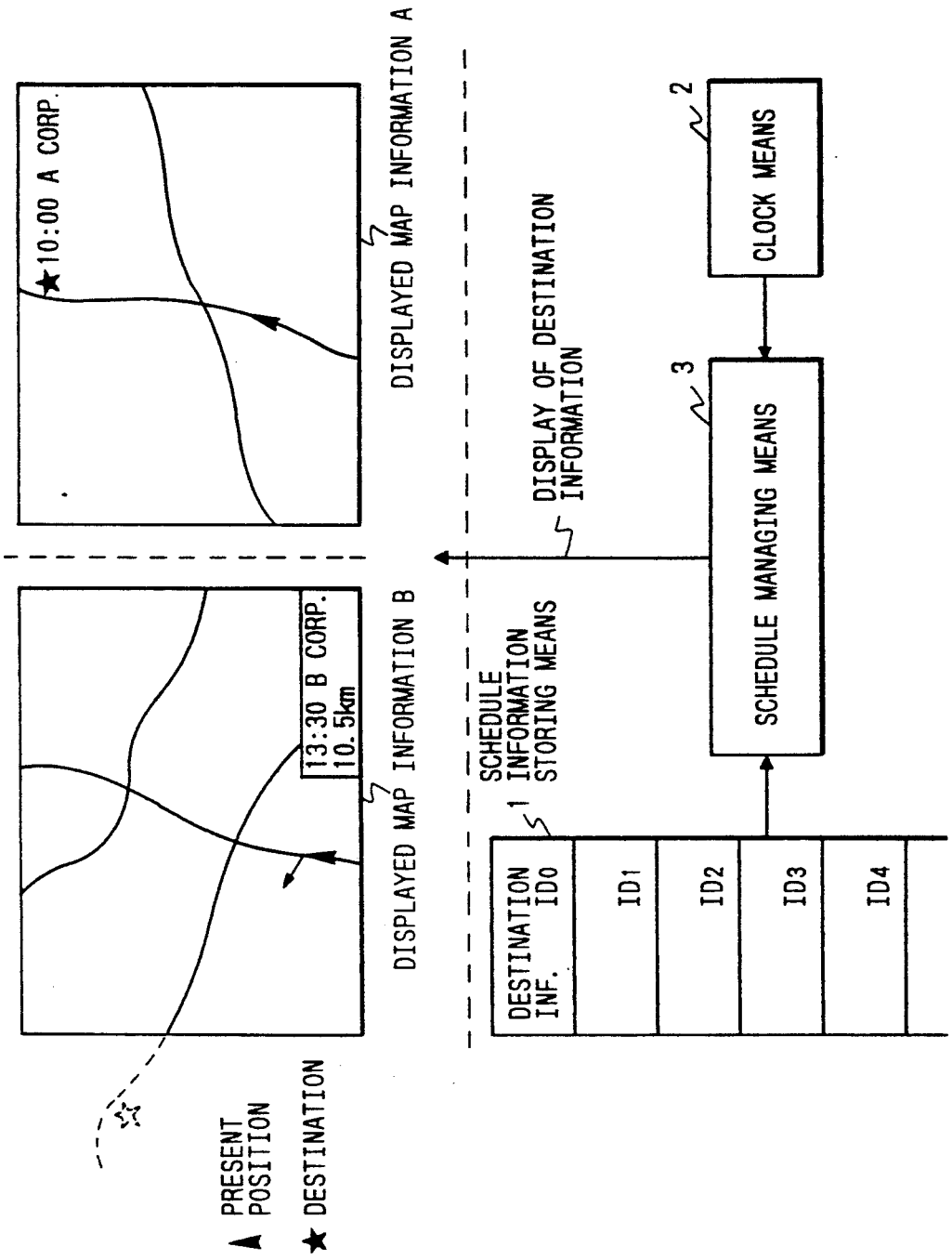
FIG. 1 is a diagram illustrative of the principle of the present invention.

FIG. 5 is a flowchart showing a process of displaying the destination information. First, the controller 27 obtains the coordinate information of the destination in step S21, and then judges in step S22 whether the coordinates are located within the map being displayed. If the judgment is affirmative, in step S23 the controller 27 displays a destination mark, scheduled arrival time and destination name at the position on the map which corresponds to the coordinates, as shown in FIG. 1 (displayed map information A). On the other hand, the judgment is negative, in step S24 the controller 27 calculates a distance and a direction from the present position to the destination. Then, the controller 27 displays in step S25 an arrow indicating the calculated direction at the tip of the mark indicating the present position, and also displays in step S26 the calculated distance to the destination, scheduled arrival time and destination name at a predetermined position on the displayed picture, as shown in FIG. 1 (displayed map information B). Thus, the process is finished. Since the above operation is performed at predetermined intervals, the display of the direction indicating arrow and the distance is continuously renewed until a map including the destination is displayed, and the arrow always points to the destination in spite of a change of the present position. Although in the above embodiment the arrow (i.e., direction indicating information) is displayed at the tip of the mark indicating the present position, the invention is not limited to this. For example, a mark indicating the direction may be displayed at the edge of the displayed picture that is on the line connecting the present position and the destination.

As described above, according to the navigation apparatus of the embodiment, the schedule data of one day is stored, and the destination having the scheduled arrival time closest to the present time is selected at predetermined intervals among the destinations which have not been reached yet or have the scheduled arrival times after the present time, and the information of the selected destination is displayed on the map. If the selected destination is outside the map being displayed, the arrow indicating the direction to the destination and the distance to the destination are displayed. Therefore, once the user makes a schedule and inputs the schedule data to the navigation apparatus from the personal computer, the next destination and its scheduled arrival time are displayed on the map automatically and sequentially as time elapses. Since the next destination is displayed on the map together with the present position, the both positions can be recognized at a glance and the route to the destination can also be referred to. As a result, the driver's burden can be reduced, and the apparatus can support the drive very effectively.

Although in the above embodiment the schedule data is input from the external system via the RS232C interface, the invention is not limited to such a case. For example, a standard schedule of one-day sightseeing tour of visiting noted places by automobile may be prepared and stored in the CD-ROM or ROM in advance. In this case, destinations and their scheduled arrival times are sequentially displayed for the driver's reference during a drive in a tourist resort etc., without the need of inputting schedule data each day.

An IC card may be used as a means for externally inputting the schedule data. In this case, if schedule data is stored into the IC card using, e.g., a personal computer, the schedule data can be transferred to the navigation apparatus from the IC card by simply bringing it into an automobile. Further, a radio receiver may be provided in the navigation apparatus to receive the schedule data from a remote place on a real-time basis. In this case, the invention can be applied to a system in which instructions on a destination sent from headquarters are automatically displayed on a map and a driver moves toward the destination being displayed.

As described in the foregoing, according to the invention, destination information including a location of the next destination and its scheduled arrival time is automatically displayed on a map together with a present position in a sequential manner as time elapses. Therefore, the next destination can be recognized at a glance in connection with the present position, and a route to the destination can also be referred to. As a result, the navigation system is provided which can alleviate a burden of a driver who drives according to a prepared schedule, and which can support his drive effectively.

What is claimed is:

1. A navigation apparatus comprising:
    means for determining present position of a moving body;
    means for displaying a map including the determined present position and indicating the determined present position on the map;
    means for storing a plurality of destination information each including a location of a destination and its scheduled arrival time;
    means for providing a present time; and
    means for selecting, at predetermined time intervals, one of said destination information corresponding to a destination having a scheduled arrival time closest to the present time among the destinations that the moving body has not reached yet, and for displaying the selected destination information.

2. The apparatus of claim 1, wherein the selected destination information is displayed at a position on the map which represents the selected destination.

3. The apparatus of claim 1, further comprising means for calculating a direction and a distance from the present position to the selected destination, wherein if the selected destination is located outside the map being displayed, the selecting and displaying means displays the calculated direction and distance.

4. The apparatus of claim 1, wherein the destination information includes a name of the destination.

* * * * *